Patented Mar. 10, 1942

2,276,248

UNITED STATES PATENT OFFICE 2,276,248

PROCESS OF RECLAIMING RUBBER

Walter G. Kirby, Naugatuck, Conn., assignor, by mesne assignments, to United States Rubber Company, New York, N. Y., a corporation of New Jersey No Drawing. Application March 16, 1938, Serial No. 196,155

2 Claims. (Cl. 260—720)

This invention relates to improvements in processes of reclaiming rubber, and more particularly rubber scrap or waste in which fibrous material has been incorporated, such as rubber articles resulting from the manufacture of rubber shoes, clothing, hose, automobile tires, or any other rubber or rubber-like scrap containing cellulosic fibres.

In order to define my process and distinguish it from other known processes I describe the two rubber reclaiming processes most widely used, namely, the "digester" or solution process and the "heater" or semi-dry process.

The digester or solution process consists of heating, under pressure in a closed steam jacketed container, ground scrap rubber waste immersed in a solution of a cellulose-destroying chemical such as caustic soda or zinc chloride until the fibre is partially or wholly destroyed and the rubber plasticized. The charge is then washed free from the chemical, dried and milled. This process produces a washed reclaim which finds a special use in such grades of rubber goods as automobile tires.

The usual hitherto known heater process consists of treating ground scrap rubber in a dry or semi-dry condition in trays or pans in an autoclave or heater with steam under pressure until the rubber is plasticized. The plasticized scrap is then removed from the heater and milled. Since there is little or no processing shrinkage and washing and drying are not required, this process is more economical than the digester process.

A majority of the scrap rubber previously treated by the hitherto known heater process was free from fibre because when fibre was present the processing period required to destroy same by heat alone was unusually long and chemicals that have been tried to shorten this period such as caustic soda left residues that were detrimental to the finished reclaim unless washed. For example, when heat or steam alone was used a minimum processing period of 24 hours at 150 pounds was required to sufficiently destroy the fibre for milling purposes. When caustic soda was added to hasten the destruction of fibre, six to eight percent based on the weight of the scrap was necessary and the residue from this is known to be detrimental to rubber goods. For this reason a majority of rubber scrap with fibre was treated by the digester process.

The object of my process is to provide a more efficient means of using the lower cost heater process for the reclaiming of fibre-containing scrap such as automobile tires and other fibre-reinforced rubber waste. Since our process provides a means of lowering the cost of the already low cost heater process it offers a source for a reclaim that is especially useful to a large range of rubber goods.

The saving in costs is made possible by a shorter processing period, elimination of the need of washing and drying, the use of a single boat as a scrap container instead of a number of trays or pans, the use of a lower percent of a less expensive reagent, the absence of a loss in weight due to processing shrinkage and the production of a reclaim that is easy to plasticize and refine in the mill room.

The quality of the reclaim produced is improved for the above mentioned purposes because it contains a thoroughly dispersed and disintegrated cellulose which tends to make it flat milling and non-shrinking when calendered in large sections; also because it is neutral to alkali or acid and contains no chemical residues from same.

An object of this invention is to provide a heater process having numerous advantages over the known caustic soda solution and heater processes, and the acid process, of preparing cellulose-type reclaim in which the cellulose is but partially destroyed, whereby to make the reclaim useful in a large range of rubber goods such as auto and floor mats and cheaper grades of mechanical goods. Among such advantages are greater economy of production, shorter processing time, elimination of the need of washing and drying, greater ease of mill room finishing, improved quality of finished reclaim which is a non-tacky, flat-milling, easy dispersing type of reclaim, substantially non-shrinking and hence desirable for use in calendered or molded mats where single pieces are made in large sections. Other objects and advantages will be apparent from the hereinafter description.

According to the invention the fibre-containing scrap is comminuted or broken down to suitable mesh and dampened with a solution of a salt capable in the presence of heat and cellulose of decomposing to liberate a cellulose-carbonizing acid. In the preferred form of the invention a solution of ammonium chloride, containing at least .25% by weight of ammonium chloride, is used. The rubber scrap-salt mix is then directly subjected to a combination air and steam treatment. During this treatment in the presence of heat, the salt disintegrates the fibre by freeing ammonia and hydrogen chloride. The acid tends to disintegrate the fibre throughout the scrap, with the aid of oxygen supplied by the air which oxygen further acts as a plasticizing agent. When the mass containing the disintegrated cellulose is in a semi-softened non-gelatinous condition, the influence of the air is removed as by exhausting it from the treating chamber, and the mass is then subjected to the direct action of steam under pressure in a closed chamber for a time sufficient to render it readily millable without further treatment.

The following example illustrates a preferred mode of practicing the invention, the pressures being gauge:

*Example 1.*—Auto tire scrap is cracked to about one-half inch mesh, mixed in a mechanical mixer with one per-cent by weight of ammonium chloride dissolved in enough water to dampen all the associated fibre. The scrap is then loaded into boats of approximately 3,600 pound capacity and these are pushed into horizontal steam heaters. Air under pressure is then turned into the heater and the pressure held at about 70 pounds per square inch for about 10 minutes or a time until the air is thoroughly distributed throughout the scrap. The presence of the fibre prevents the mass from packing. All outlets are closed and then steam under pressure is admitted and raised to about 150 lbs./sq. in. and so held for about 20 minutes or a time until the mass is thoroughly semi-softened. All the air and steam is then exhausted from the chamber. Thereafter the steam is again turned on and held at about 150 pounds pressure (365° F.) for about 9½ hours. The plasticized scrap containing the partially disintegrated cellulose is then ready for milling. It is non-tacky, substantially neutral, and mills easily to uniformly disperse the partially-disintegrated fibre throughout the mass.

Generally, the air treatment may range from 10 minutes to 2 hours, and the heating may be carried out from about 212° F. to about 400° F. The steam treatment and temperature may be varied depending on the type of scrap, tires, for example requiring from 1 to 15 hours at about 365° F.

I would have it understood that I make no claim to the use of chemicals commonly used in the digester solution process or to any improvement in that process. My claims are limited to an improvement in the heater process as described in this specification and more particularly to the combined action of ammonium chloride and air in this process which combined action has for its effect the reduction of the processing period from approximately 24 hours at 150 pounds to 10 hours at 150 pounds steam pressure.

The present process is also to be distinguished from those processes in which the fibre is entirely destroyed and removed by washing or gelatinized and allowed to remain in the stock. Caustic soda turns the fibre to a gelatinized form which when left in the stock makes it difficult to mill and finish in the mill room. In those processes employing caustic soda relatively large quantities of caustic solution are required because a small amount tends to strengthen the fibre rather than to weaken it. Because of the quantity of caustic solution required the use of large volume boats are impractical since it drains toward the bottom producing a non-uniform product. Hence it is obvious that the present process—in eliminating the need of costly pan and tray equipment; in providing less expensive reagents; in providing a shorter processing time; in eliminating the washing and drying operations, and in the elimination of caustic gelatinized cellulose in the finished reclaim which makes it hygroscopic and otherwise inferior—gives a low-cost, improved-quality, cellulose-type reclaim. This reclaim may be milled with a smooth surface and when calendered out into a thin sheet shows substantially no tendency to shrink in size or draw out of shape.

Having thus described my invention, what I claim and desire to protect by Letters Patent is:

1. A heater process of producing an improved quality substantially neutral cellulose-type reclaim which comprises dampening a broken-down fibre-containing waste rubber stock with a solution of ammonium chloride, converting the mixed semi-dry mass to a semi-plastic condition by the combined action of heat, air, and steam under pressure, with partial disintegration of the fibres, afterwards continuing the plasticization of the stock by the action of steam under pressure, and then, without the necessity of washing or drying milling the partially-disintegrated fibre and rubber stock whereby to uniformly disperse the fibres throughout the mass.

2. A heater process of producing an improved quality substantially neutral cellulose-type reclaim which comprises dampening a broken-down fibre-containing waste rubber stock with ammonium chloride dissolved in water sufficient to dampen all the fibres of the stock, converting the mixed semi-dry mass to a semi-plastic condition by the direct and combined action of heat, air, and steam under pressure with partial disintegration of the fibres, afterwards continuing the plastication of the stock by the direct action of steam under pressure, and then, without the necessity of washing or drying, milling the rubber stock containing partially-disintegrated cellulose whereby to uniformly disperse the cellulose throughout the mass.

WALTER G. KIRBY.